United States Patent
Wu et al.

(10) Patent No.: US 11,745,397 B2
(45) Date of Patent: Sep. 5, 2023

(54) FRAGRANCE MAT AND METHOD OF MANUFACTURING THE SAME

(71) Applicant: VONRANG INTERNATIONAL CORPORATION, Taipei (TW)

(72) Inventors: Chun-Yi Wu, Taipei (TW); Tsu-Wei Liu, Taipei (TW)

(73) Assignee: VONRANG INTERNATIONAL CORPORATION, Taipei (TW)

( * ) Notice: Subject to any disclaimer, the term of this patent is extended or adjusted under 35 U.S.C. 154(b) by 0 days.

(21) Appl. No.: 17/576,992

(22) Filed: Jan. 16, 2022

(65) Prior Publication Data

US 2023/0202081 A1    Jun. 29, 2023

(30) Foreign Application Priority Data

Dec. 29, 2021 (TW) .............................. 110149488

(51) Int. Cl.
*B29C 44/32* (2006.01)
*C11B 9/00* (2006.01)
*B29C 44/28* (2006.01)

(52) U.S. Cl.
CPC ............ *B29C 44/334* (2016.11); *B29C 44/28* (2013.01); *C11B 9/00* (2013.01)

(58) Field of Classification Search
CPC .............................. B29C 44/334; B29C 44/28
USPC ........................................................ 264/45.8
See application file for complete search history.

(56) References Cited

U.S. PATENT DOCUMENTS

| 2,981,629 | A  | * | 4/1961 | Ginnette | A23L 2/105 |
|           |    |   |        |          | 435/246 |
| 3,007,205 | A  | * | 11/1961 | House | B29C 44/467 |
|           |    |   |        |       | 264/257 |
| 2002/0086804 | A1 | * | 7/2002 | Shefer | A61L 9/042 |
|              |    |   |        |        | 510/102 |
| 2010/0225017 | A1 | * | 9/2010 | Nakagawa | B60R 13/08 |
|              |    |   |        |          | 264/45.8 |

FOREIGN PATENT DOCUMENTS

| CN | 202271252 U | 6/2012 |
| CN | 103114459 A | 5/2013 |
| CN | 103352375 B | 2/2016 |
| CN | 107518748 A | 12/2017 |
| DE | 102009011059 A1 * | 9/2010 | ......... B01D 53/0407 |
| KR | 200361925 Y1 * | 9/2004 | ............ A47C 31/00 |

(Continued)

OTHER PUBLICATIONS

Machine translation KR200361925Y1 (Year: 2004).*

(Continued)

*Primary Examiner* — Matthew J Daniels
*Assistant Examiner* — Wayne K. Swier
(74) *Attorney, Agent, or Firm* — Maschoff Brennan

(57) ABSTRACT

A method of manufacturing a fragrance mat, comprising a material preparation step, which, by stirring at a predetermined stirring temperature, evenly mixes fragrance mat raw material and foaming related additives material to obtain an unformed fragrance mat foam material, the fragrance mat raw material containing polyvinyl chloride and essential oil, a mesh providing step, a material release step, a foaming step and a cooling step to obtain the fragrance mat having a specific diffusion coefficient and a specific diffusion flux.

8 Claims, 6 Drawing Sheets

(56) References Cited

FOREIGN PATENT DOCUMENTS

KR         10-1497426     *   2/2015   ............. B32B 27/18
TW          I281526 B   *   5/2007   ............... D06N 3/06

OTHER PUBLICATIONS

Machine translation TWI281526B (Year: 2007).*
Machine translation DE102009011059A1 (Year: 2010).*
Machine translation KR101497426 (Year: 2015).*

* cited by examiner

FRAGRANCE MAT AND METHOD OF MANUFACTURING THE SAME

FIELD OF THE INVENTION

The present invention relates to a mat and a method of manufacturing a mat, and more particularly relates to a fragrance mat and a method of manufacturing the same.

BACKGROUND OF THE INVENTION

Most of the conventional fragrance mats are made by injecting fragrance substances into a mat or prepared by attaching additional objects with diffuser function to the mat. However, the conventional fragrance mats manufactured in the above manner is usually hard to keep its fragrance being spreaded for a long time.

Therefore, there is still a need to improve the conventional fragrance mats and the method of manufacturing the conventional fragrance mats.

SUMMARY OF THE INVENTION

Accordingly, one objective of the present invention is to provide a fragrance mat and a method of manufacturing the same, which enables the fragrance mat of the present invention to have a fragrance before the mat has been formed, and to have a specific fragrance diffusion coefficient and a specific fragrance diffusion flux, so that the fragrance of the fragrance mat of the present invention can be lasting for a long time.

In order to overcome the technical problems in prior art, the present invention provides a method of manufacturing a fragrance mat, comprising a material preparation step, which, by stirring at a predetermined stirring temperature, evenly mixes fragrance mat raw material and foaming related additives material to obtain an unformed fragrance mat foam material, the fragrance mat raw material containing polyvinyl chloride and essential oil; a mesh providing step, which provides a central mesh and outputs the central mesh in a continuous manner; a material release step, which applies a discharging control device to release the unformed fragrance mat foam material in a dropping-by-gravity manner such that the unformed fragrance mat foam material flows down on an upper surface of the central mesh and penetrates the central mesh to a lower surface of the central mesh to form an unfoamed fragrance mat in such a manner that the upper and lower surfaces of the central mesh are covered with the unformed fragrance mat foam material; a foaming step, which open-foams the unfoamed fragrance mat at a predetermined foaming temperature to form an original fragrance mat body; and a cooling step, which cools down the original fragrance mat body to obtain the fragrance mat having a specific diffusion coefficient and a specific diffusion flux.

According to one embodiment of method of the present invention, in the material preparation step, the predetermined stirring temperature is in a range from 25° C. to 30° C.

According to one embodiment of method of the present invention, in the material release step, the discharging control device is provided to enable, during the central mesh moves relative to the discharging control device and is continuously output, the unformed fragrance mat foam material to flow down in the dropping-by-gravity manner on the upper surface of the central mesh and penetrates the central mesh to the lower surface of the central mesh to cover the unformed fragrance mat foam material on the upper and lower surfaces of the central mesh.

According to one embodiment of method of the present invention, in the foaming step, the predetermined foaming temperature is in a range from 190° C. to 210° C.

According to one embodiment of method of the present invention, the cooling step is a roll cooling step, which performs a rolling process on the original fragrance mat body at a predetermined cooling temperature.

According to one embodiment of method of the present invention, in the cooling step, the predetermined cooling temperature is in a range from 0° C. to 6° C.

According to one embodiment of the present invention, the method is further comprises a rolling step, which rolls the fragrance mat into a fragrance mat roll.

According to one embodiment of method of the present invention, the diffusion coefficient is in range from $0.72 \times 10^{-5}$ to $4.76 \times 10^{-5}$ $(m^2/s)$ at 25° C. and 101.325 kPa, according to the density of polyvinyl chloride.

According to one embodiment of method of the present invention, the diffusion flux is in a range from 0.04 to 97.45 $\mu mol/(m^2 \sqrt[4]{h})$ at 25° C.±5° C. and 101.325 kPa±50 kPa.

With the technical means adopted by the present invention, the fragrance mat of the present invention can have the fragrance before the mat has been formed. Furthermore, since the mat body of the present invention is a product made of the essential oil and the fragrance mat raw material without adding any addition fragrance substance (for example, injecting the fragrance liquid into the mat body), the fragrance mat of the present invention can have the specific fragrance diffusion coefficient and the specific fragrance diffusion flux, so that the fragrance of the fragrance mat of the present invention can be lasting for a long time.

DETAILED DESCRIPTION OF THE PREFERRED EMBODIMENTS

The preferred embodiments of the present invention are described in detail below with reference to FIG. 1 to FIG. 4. The description is used for explaining the embodiments of the present invention only, but not for limiting the scope of the claims.

Figure 1:
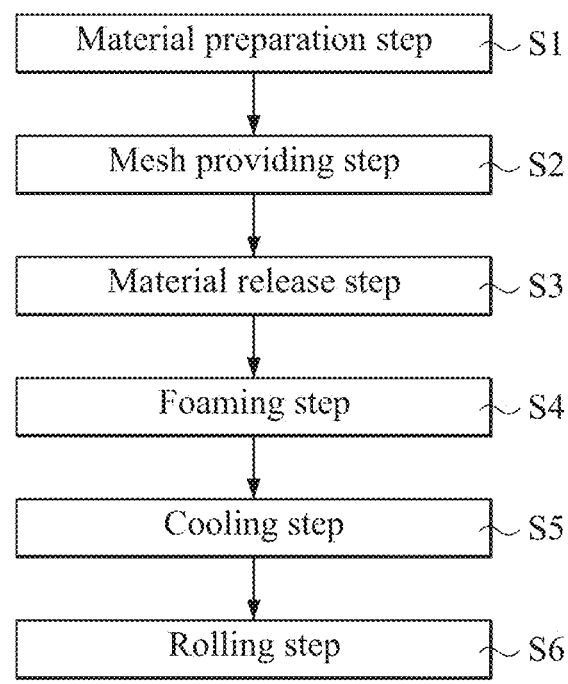
FIG. 1 is a flow chart illustrating a method of manufacturing a fragrance mat according to one embodiment of the present invention.
Figure 2A:
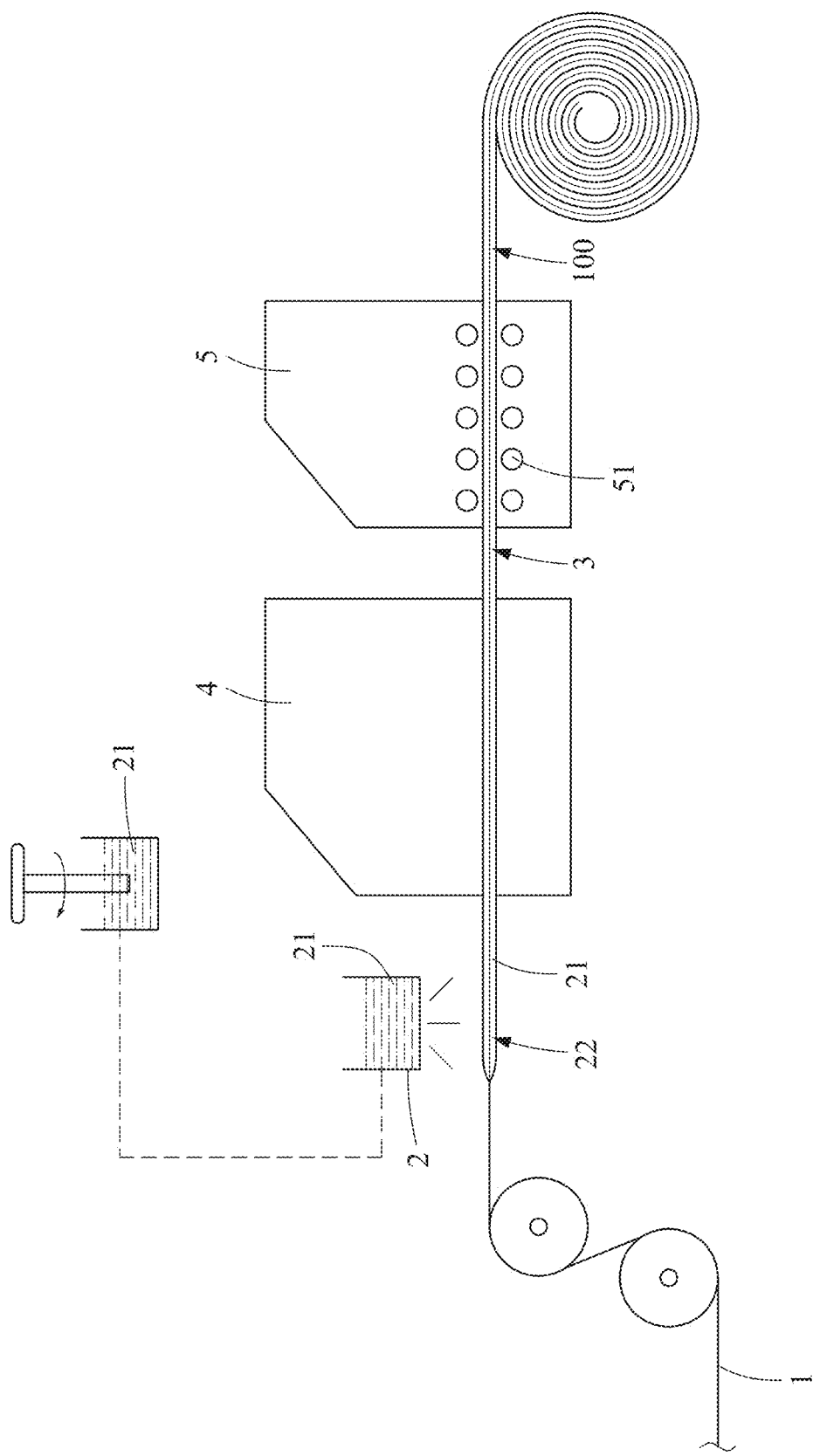
FIG. 2a is a schematic diagram illustrating the method according to the embodiment of the present invention.

As shown in FIG. 1 to FIG. 2a, a method of manufacturing a fragrance mat 100 according to an embodiment of the present invention comprises: a material preparation step S1, which, by stirring at a predetermined stirring temperature, evenly mixes fragrance mat raw material and foaming related additives material to obtain an unformed fragrance mat foam material 21, the fragrance mat raw material containing polyvinyl chloride and essential oil. The unformed fragrance mat foam material 21 is then moved to a discharging control device for subsequent steps.

In detail, the essential oil contained in the fragrance mat raw material is an important raw material that gives the fragrance mat 100 of the present invention the characteristic of fragrance, in other words, the fragrance mat 100 of the present invention has a fragrance before it is formed.

As shown in FIG. 1, in the method of manufacturing the fragrance mat 100 according to an embodiment of the present invention, in the material preparation step, the predetermined stirring temperature is in a range from 25° C. to 30° C.

In detail, the fragrance mat raw material and the foaming related additives material used in the present invention can be uniformly stirred at any temperature, preferred stirring temperature is a nearroom temperature. In other words, in the material preparation step S1, the method of manufacturing the fragrance mat 100 of the present invention can make the fragrance mat raw material and the foaming related additives material stir uniformly without using high temperature, thereby achieving secondary effect of energy saving and production cost saving.

Figure 2B:
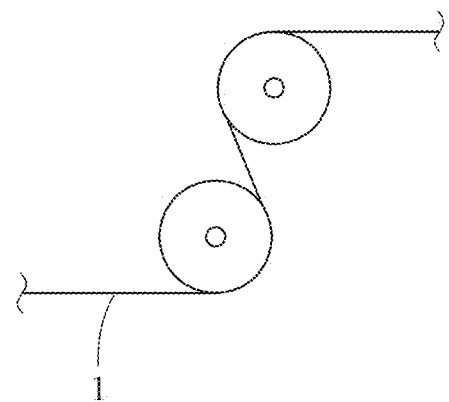
FIG. 2b is a schematic diagram illustrating the method according to the embodiment of the present invention.

As shown in FIGS. 1 and 2a to 2b, after the material preparation step S1, the method further comprises a mesh providing step S2, which provides a central mesh 1 and outputs the central mesh 1 in a continuous manner, wherein the central mesh 1 has a mesh structure for the unformed fragrance mat foam material 21 to penetrate from an upper surface of the central mesh 1 to a lower surface of the central mesh 1.

Figure 2C:
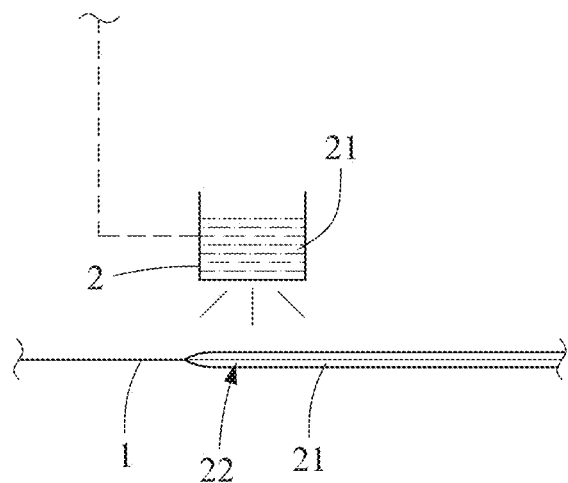
FIG. 2c is a schematic diagram illustrating the method according to the embodiment of the present invention.

As shown in FIGS. 1, 2a and 2c, after the mesh providing step S2, the method further comprises a material release step S3, which applies a discharging control device 2 to release the unformed fragrance mat foam material 21 in a dropping-by-gravity manner such that the unformed fragrance mat foam material 21 flows down on the upper surface of the central mesh 1 and penetrates the central mesh 1 to the lower surface of the central mesh 1 to form an unfoamed fragrance mat 22 in such a manner that the upper and lower surfaces of the central mesh 1 are covered with the unformed fragrance mat foam material 21.

Figure 2D:
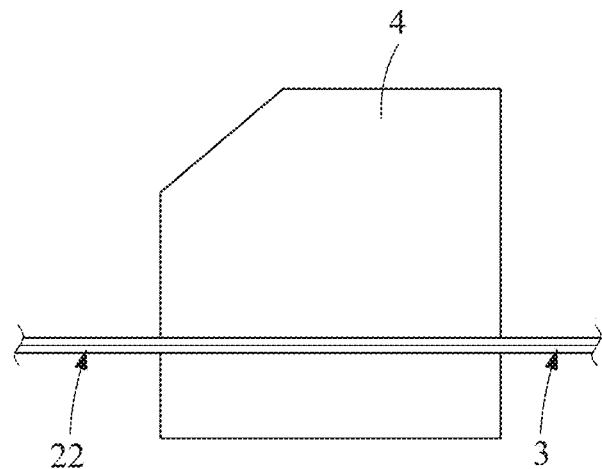
FIG. 2d is a schematic diagram illustrating the method of manufacturing fragrance mat according to the embodiment of the present invention.

As shown in FIGS. 1, 2a and 2d, after the material release step S3, the method further comprises a foaming step S4, which open-foams the unfoamed fragrance mat 22 at a predetermined foaming temperature to form an original fragrance mat body 3.

In detail, as shown in FIGS. 1, 2a and 2d, the fragrance mat 100 of the present invention is foamed in an open foaming manner. Compared with closed foaming, the length of the fragrance mat 100 in the open foaming is not limited by the size of a closed container. Furthermore, the unfoamed fragrance mat 22 formed after the material release step S3 must undergo foaming through the foaming step S4 to form the precursor of the fragrance mat 100, i.e., the original fragrance mat 3. The foaming step S4 is to send the unfoamed fragrance mat 22 into an oven 4 about 40 meters long for open foaming, and the oven 4 is set with the predetermined foaming temperature.

Figure 2E:
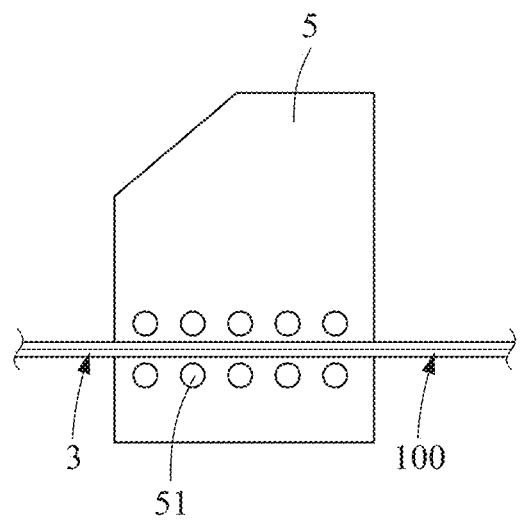
FIG. 2e is a schematic diagram illustrating the method according to the embodiment of the present invention.

As shown in FIGS. 1, 2a and 2e, after the foaming step S4, the method further comprises a cooling step S5, which cools down the original fragrance mat 3 to obtain the fragrance mat 100 having a specific diffusion coefficient and a specific diffusion flux.

As shown in FIGS. 1, 2a and 2c, in the method of manufacturing the fragrance mat 100 according to the embodiment of the present invention, in the material release step S3, the discharging control device 2 is provided to enable, during the central mesh 1 moves relative to the discharging control device 2 and is continuously output, the unformed fragrance mat foam material 21 to flow down in the dropping-by-gravity manner on the upper surface of the central mesh 1 and penetrates the central mesh 1 to the lower surface of the central mesh 1 to cover the unformed fragrance mat foam material 21 on the upper and lower surfaces of the central mesh 1.

As shown in FIG. 1, in the method of manufacturing the fragrance mat 100 according to the embodiment of the present invention, in the foaming step, the predetermined foaming temperature is in a range from 190° C. to 210° C.

As shown in FIGS. 1, 2a and 2e, in the method of manufacturing the fragrance mat 100 according to the embodiment of the present invention, the cooling step S5 is a roll cooling step, which performs a rolling process on the original fragrance mat body 3 at a predetermined cooling temperature.

As shown in FIGS. 1, 2a and 2e, in the method of manufacturing the fragrance mat 100 according to the embodiment of the present invention, in the cooling step S5, the original fragrance mat body 3 is cooled down at the predetermined cooling temperature in a range from 0° C. to 6° C.

In detail, since the original fragrance mat body 3 is the product obtained by the foaming step S4, the temperature of the formed original fragrance mat body 3 will also fall within the range of the predetermined foaming temperature e.g., 190 to 210° C. Therefore, the cooling step S5 is required to immediately reduce the high temperature of the original fragrance mat body 3 formed, so that the original fragrance mat body 3 becomes the fragrance mat 100 at room temperature.

Furthermore, in the cooling step S5, the original fragrance mat body 3 will be moved to the cooling device 5, the cooling device 5 is set with the predetermined cooling temperature, the original fragrance mat body 3 is cooled by the cooling air blown from the cooling device 5 and a slow rolling process of the cooling roller 51 (the temperature of the cooling roller 51 is also the predetermined cooling temperature). The speed of the slow rolling process is about 9 to 14 meters of the original fragrance mat 3 per minute.

Figure 2F:
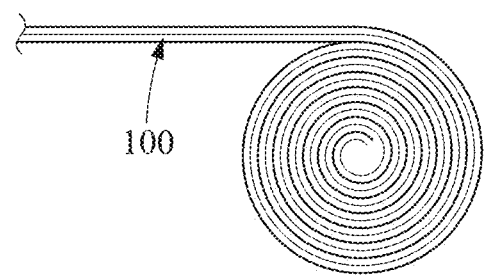
FIG. 2f is a schematic diagram illustrating the method according to the embodiment of the present invention.

As shown in FIGS. 1, 2a and 2f, the method of manufacturing the fragrance mat 100 according to an embodiment of the present invention, after the cooling step S5, further comprises a rolling step S6, which rolls the fragrance mat 100 into a fragrance mat roll.

In detail, the fragrance mat 100 is rolled up into the fragrance mat roll to facilitate cutting and packaging.

Figure 3:
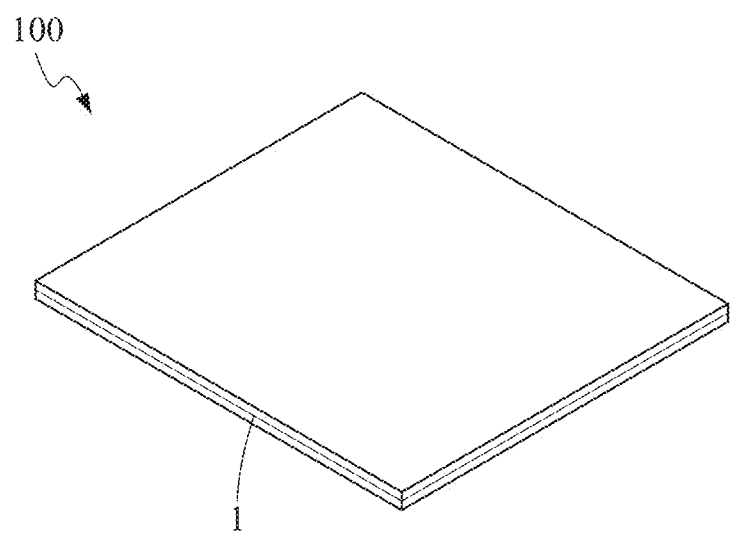
FIG. 3 is a schematic perspective view of a fragrance mat according to one embodiment of the present invention.

As shown in FIG. 3, the fragrance mat 100 according to an embodiment of the present invention is a fragrance mat obtained by the aforementioned manufacturing method.

As shown in FIG. 3, the fragrance of the fragrance mat 100 can be given off from the upper and lower surfaces of the fragrance mat 100 as well as from the sides of the fragrance mat 100, with the strongest concentration of the fragrance given off from the sides.

In the method of manufacturing the fragrance mat 100 according to an embodiment of the present invention, the diffusion coefficient is in range from $0.72\times10^{-5}$ to $4.76\times10^{-5}$ (m²/s) at 25° C. and 101.325 kPa, according to the density of polyvinyl chloride.

In the method of manufacturing the fragrance mat 100 according to an embodiment of the present invention, the diffusion flux is in a range from 0.04 to 97.45 μmol/(m²·h) at 25° C.±5° C. and 101.325 kPa±50 kPa.

TABLE 1

| Fragrance mat No. | diffusion flux (μmol) | | | | |
|---|---|---|---|---|---|
| Y40 | 0 | 0.92 | 1.35 | 4.91 | 11.63 |
| Y45 | 0 | 0.03 | 0.04 | 0.15 | 0.32 |
| Y50 | 0 | 1.74 | 2.93 | 6.19 | 14.11 |
| Y55 | 0 | 2.63 | 4.87 | 9.17 | 18.28 |
| Y60 | 0 | 3.02 | 7.22 | 15.82 | 21.19 |
| G40 | 0 | 79.41 | 85.34 | 89.63 | 92.1 |
| G45 | 0 | 73.65 | 80.23 | 86.08 | 90.11 |
| G50 | 0 | 88.74 | 92.98 | 94.35 | 103.28 |
| G55 | 0 | 67.39 | 72.14 | 78.14 | 82.73 |
| G60 | 0 | 92.65 | 97.45 | 98.23 | 125.39 |
| (m²·h) | 0 | 0.5 | 1 | 1.5 | 2 |
| | | | (Time) | | |

Figure 4:
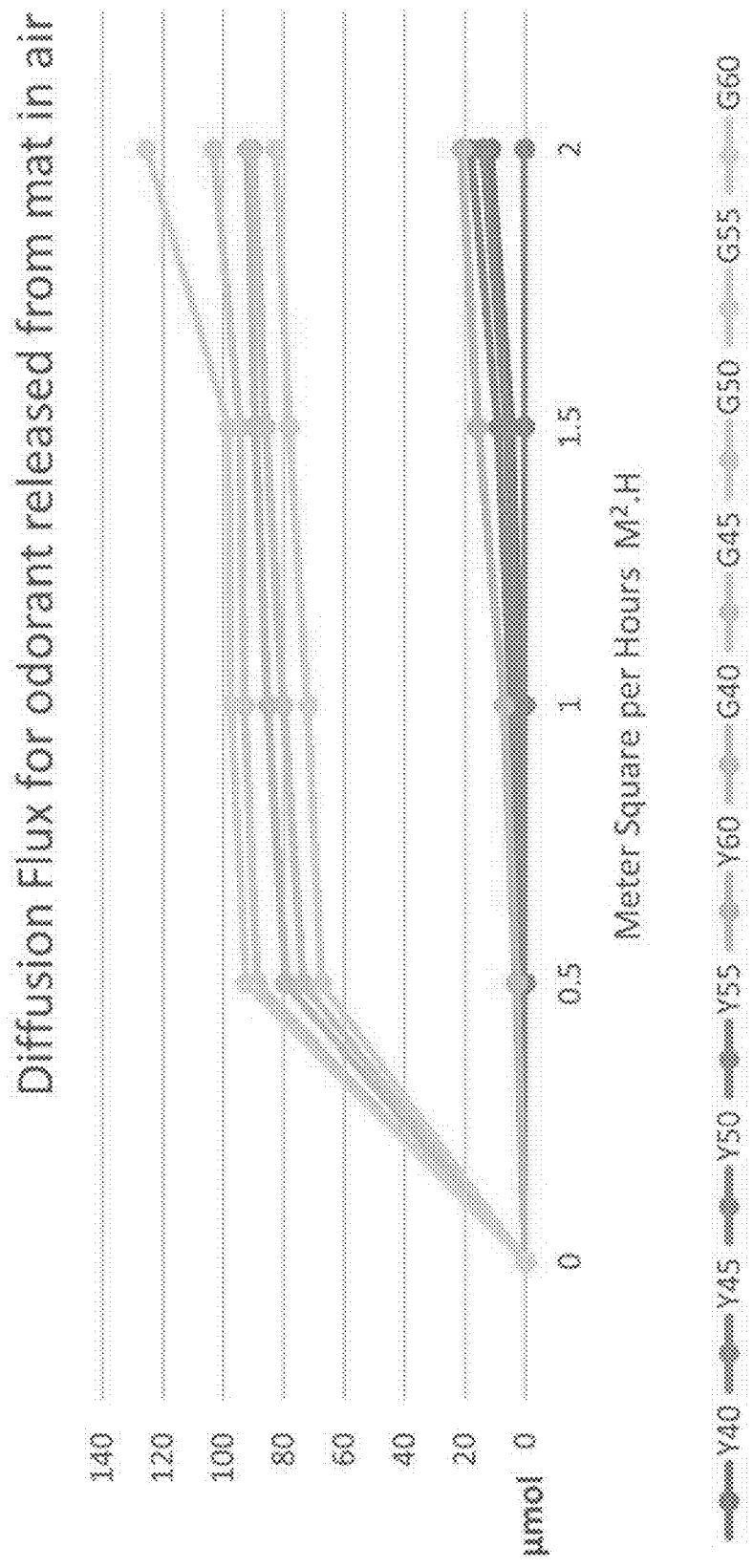
FIG. 4 is a schematic diagram illustrating the diffusion flux according to the embodiment of the present invention

As shown in FIG. 4 and table 1, plural fragrance mat No. represents a plurality of fragrance mats of different specifications obtained by the method of the present invention, the predetermined diffusion flux is in a range of is 0.04 to 97.45 μmol/(m2·h).

The fragrance mat 100 obtained by the method mentioned above is a product made of the fragrance mat raw material and the foaming related additives material, the fragrance mat raw material include polyvinyl chloride and essential oil. The fragrance mat 100 is provided with the fragrance before the mat has been formed. The fragrance mat 100 is manufactured without adding any addition fragrance substance and without attaching additional objects with diffuser function to the mat. Therefore, the fragrance mat 100 of the present invention can have the specific fragrance diffusion coefficient and the specific fragrance diffusion flux, so that the fragrance of the fragrance mat 100 can last for a long time.

The above description should be considered as only the discussion of the preferred embodiments of the present invention. However, a person skilled in the art may make various modifications without deviating from the present invention. Those modifications still fall within the spirit and scope defined by the appended claims.

What is claimed is:

1. A method of manufacturing a fragrance mat, comprising:
   a material preparation step, which, by stirring at a predetermined stirring temperature, evenly mixes fragrance mat raw material and foaming related additives material to obtain an unformed fragrance mat foam material, the fragrance mat raw material containing polyvinyl chloride and essential oil;
   a mesh providing step, which provides a central mesh and outputs the central mesh in a continuous manner;
   a material release step, which applies a discharging control device to release the unformed fragrance mat foam material in a dropping-by-gravity manner such that the unformed fragrance mat foam material flows down on an upper surface of the central mesh and penetrates the central mesh to a lower surface of the central mesh to form an unfoamed fragrance mat in such a manner that the upper and lower surfaces of the central mesh are covered with the unformed fragrance mat foam material;
   a foaming step, which open-foams the unfoamed fragrance mat at a predetermined foaming temperature to form an original fragrance mat body; and
   a cooling step, which cools down the original fragrance mat body at a predetermined cooling temperature in a range from 0° C. to 6° C. to obtain the fragrance mat having a specific diffusion coefficient and a specific diffusion flux.

2. The method as claimed in claim 1, wherein in the material preparation step, the predetermined stirring temperature is in a range from 25° C. to 30° C.

3. The method as claimed in claim 1, wherein in the material release step, the discharging control device is provided to enable, during the central mesh moves relative to the discharging control device and is continuously output, the unformed fragrance mat foam material to flow down in the dropping-by-gravity manner on the upper surface of the central mesh and penetrates the central mesh to the lower surface of the central mesh to cover the unformed fragrance mat foam material on the upper and lower surfaces of the central mesh.

4. The method as claimed in claim 1, wherein in the foaming step, the predetermined foaming temperature is in a range from 190° C. to 210° C.

5. The method as claimed in claim 1, wherein the cooling step is a roll cooling step, which performs a rolling process on the original fragrance mat body at the predetermined cooling temperature.

6. The method as claimed in claim 1, further comprising a rolling step, which rolls the fragrance mat into a fragrance mat roll.

7. The method as claimed in claim 1, wherein the diffusion coefficient is in range from $0.72\times10^{-5}$ to $4.76\times10^{-5}$ (m²/s) at 25° C. and 101.325 kPa, according to the density of polyvinyl chloride.

8. The method as claimed in claim 1, wherein the diffusion flux is in a range from 0.04 to 97.45 μmol/(m²·h) at 25° C.±5° C. and 101.325 kPa±50 kPa.

* * * * *